March 5, 1935.  A. H. KENNEDY  1,993,243
WATER METER CONNECTION
Filed April 3, 1934
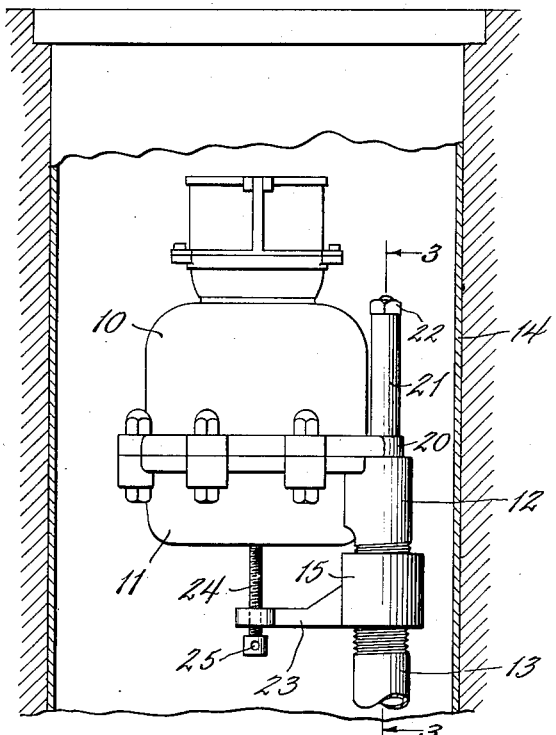
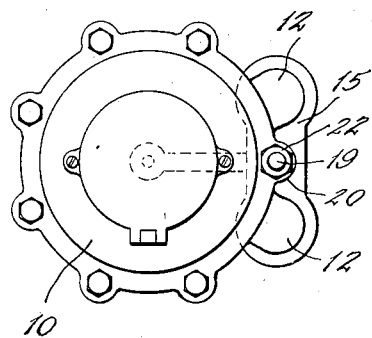
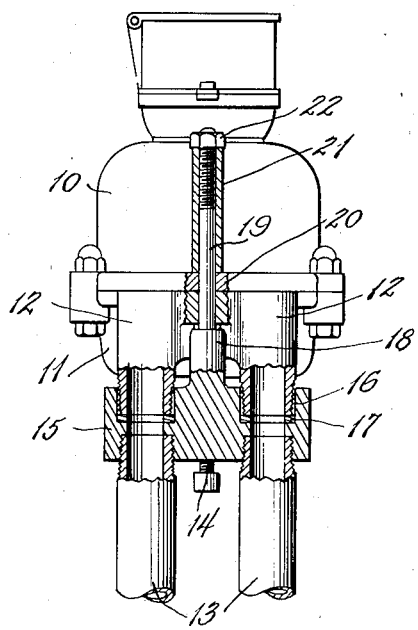
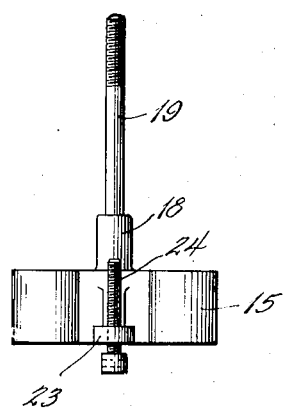
Inventor
A. H. Kennedy
By
A. D. Adams
Attorney Patented Mar. 5, 1935

1,993,243

UNITED STATES PATENT OFFICE 1,993,243

WATER METER CONNECTION

Albert H. Kennedy, Rockport, Ind.

Application April 3, 1934, Serial No. 718,866

6 Claims. (Cl. 285—3)

This invention relates to water-meter connections and aims to provide certain important improvements on the meter connection shown in U. S. Patent No. 912,383, dated February 16, 1909. One of the objects is to provide a duplex fitting for the inlet and outlet conduits having a spindle or stud bolt projecting through the meter flange above the bulge in the meter casing so that the nut or bolt head, as the case may be, is easily accessible and can be removed with an ordinary wrench. A further object is to provide a supporting arm on the duplex fitting having adjustable means to support the overhanging meter casing and relieve the parts of the weight strains.

Other aims and advantages of the invention will appear in the specification, when considered in connection with the accompanying drawing, wherein:

Fig. 1 is a side elevation of a meter connection embodying the invention;

Fig. 2 is a top plan view;

Fig. 3 is a rear elevation, parts being shown in section; and

Fig. 4 is a front elevation of the improved fitting.

The modern type of water-meter is more or less difficult to install and remove because the connections are not easily accessible inside the usual meter box. In some instances, special wrenches are required due to the limited space between the meter casing and meter box or housing. When the old union couplings are employed it is sometimes necessary to dig up the meter box in order to disconnect the meter. Furthermore, the connections sometimes spring leaks due to the strain imposed on them by the overhanging weight of the meter. This invention provides a greatly simplified and easily accessible connection which can be made with an ordinary socket wrench and, also, an adjustable support for the meter to relieve the joints of the strain.

Referring particularly to the drawing, there is shown a modern type of meter having a flanged casing composed of an upper section 10 and a lower section 11 bolted together in the usual manner. The lower section has vertical spuds or nipples 12 cast integral with it and these nipples are usually screw threaded so as to be connected by union couplings or other fittings with the service inlet and outlet pipes 13 in the ordinary meter box or housing 14 which is buried in the ground, usually at the curb.

In accordance with this invention, the spuds or nipples 12 are connected to the service pipes by means of a duplex fitting or coupling 15 which is preferably made of a cast metal block in the form of a crosshead. This coupling is somewhat similar to that shown in the aforesaid patent in that it has tapped openings to receive the service pipes 13 and sockets 16 to receive the spuds or nipples 12, the sockets being in the form of counterbores having shoulders at the bottom and the ends of the nipples are clamped therein against gaskets 17.

Referring to Figs. 3 and 4, the duplex coupling 10 is shown as having an integral upstanding projection 18 between the two sockets 16 and the nipples 12 and a reduced vertical extension 19 in the form of a rod or stem, which may be and preferably is integral with the projection, is adapted to pass through a pair of the flange ears 20 of the meter casing. The height of the extension or stem 19 is such that its upper screw threaded end extends above the bulge in the upper section 10 of the casing. The enlarged projection 18 terminates short of the ear on the flange of the lower section of the casing to permit clamping pressure to be applied. The arrangement is such that the rear flange clamping bolt in the meter casing may be omitted and the bolt opening guided over the stem or vertical extension 19 to set the meter in place. The stem will guide the nipples properly into their sockets when the meter is held in the proper position within the meter box.

To clamp the meter with its nipples in watertight engagement with the duplex coupling, there is shown a tubular spacing sleeve 21 on the stem or extension 19 extending above the bulge in the upper part 10 of the casing and a nut 22 is screwed on the upper end of the stem or extension against the sleeve to exert clamping pressure through the sleeve to the meter flanges and the nipples. This nut, as will be seen in Fig. 1, is easily accessible and can be manipulated by an ordinary straight socket wrench, the handle of which may extend through the upper end of the box 14.

To support the meter and relieve the nipple joints of the strain which would otherwise be exerted on them by the overhanging weight, there is shown an integral arm 23 on the duplex fitting or coupling projecting forwardly to a point substantially below the longitudinal axis of the meter casing. In this example, the meter casing is supported by a set screw 24 threaded through the forward end of the arm. While the set screw may have an ordinary head, it is shown as having a hole 25 in a round head below the arm so that it may be adjusted after the meter is set in place by using an ordinary nail or other tool which will fit in the hole. This set screw will support the meter in its proper horizontal position and effectively relieve the joints of any strain due to the overhanging weight, the weight being transferred to the coupling.

From the foregoing description, it will be seen that the improved meter connection greatly facilitates the installation and removal of a meter. In fact, a meter may be installed by setting it in place with one hand and guiding the nipples into their sockets. The single sleeve 21 is then placed on the stem or extension 19 and the nut 22 screwed on the stem. Then, the set screw is adjusted to support the meter in its horizontal position with the spuds or nipples vertically alined with the service pipes and the nut is finally tightened. Also, the meter may be very quickly removed by unscrewing the single nut 22 and lifting it out of its sockets.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. A water-meter connection comprising, in combination, a duplex coupling having screw threaded connection with the service pipes and sockets to receive the meter nipples; a long vertical stem rigidly connected to said coupling and projecting through a bolt opening in the flanges of the meter and having a screw threaded end extending above the bulge in the meter casing; a cylindrical spacing sleeve on said stem above the meter flanges also extending above the bulge of the meter casing; and a clamping nut on the upper end of the stem exerting clamping pressure on the meter nipples to hold them in watertight engagement with the sockets.

2. In combination with a water-meter of the character described, a duplex coupling member connected to the water service pipes and having sockets receiving the meter nipples; means associated with the coupling member for clamping the meter nipples in the sockets; and a supporting arm projecting below the meter having adjustable means for supporting the overhanging weight of the meter.

3. A water-meter connection of the character described comprising, in combination, a duplex coupling member having a screw threaded connection with the service pipes; means for clamping the meter nipples in watertight engagement with the coupling member; a supporting arm integral with the coupling member projecting below the central portion of the meter casing; and adjustable means on said arm for supporting the overhanging weight of the meter casing.

4. In combination with a water-meter having a flanged sectional casing and a pair of vertical nipples adapted to be connected to the service pipes, a duplex coupling on the service pipes having sockets to receive said nipples; a vertical stem integral with the coupling projecting through an opening in the meter flanges above the bulge in the meter casing; a spacing sleeve on the stem; a clamping nut on the upper end of the stem exerting clamping pressure on the nipples through the spacing sleeve and meter flanges; an integral arm formed on the coupling extending forwardly below the central portion of the meter casing; and a vertical set screw carried by the arm to support the overhanging weight of the meter and transfer it to said duplex coupling.

5. In combination with a water-meter of the character described, a duplex coupling connecting the meter casing with the service pipes; a bracket arm integral with the duplex coupling and projecting below the central portion of the meter; and a set screw carried by said arm to support the overhanging weight of the meter and relieve the joint between the meter nipples and the coupling of the strain.

6. In combination with a water-meter having a flanged sectional casing and a pair of vertical nipples to be connected with service pipes, a duplex coupling connected to the service pipes and having sockets to receive said nipples; an integral upstanding projection of substantial size on said coupling; a vertical rod on said projection extending through an opening in the flanges of said casing centrally between the nipples and having a screw threaded end extending above the bulge in the casing; spacing means on the rod; and a clamping nut threaded on the upper end of the rod against the spacing means to exert clamping pressure to the nipples in said sockets and hold them in watertight engagement therewith.

ALBERT H. KENNEDY.